Feb. 28, 1950    F. A. MAXWELL    2,499,151
ADJUSTABLE TOOLHOLDER
Filed Jan. 30, 1947

INVENTOR.
FRED A. MAXWELL
BY
Richey & Watts
ATTORNEYS

Patented Feb. 28, 1950

2,499,151

UNITED STATES PATENT OFFICE 2,499,151

ADJUSTABLE TOOLHOLDER

Fred A. Maxwell, Bedford, Ohio, assignor to Jack Erwin Maxwell, Bedford, Ohio

Application January 30, 1947, Serial No. 725,406

6 Claims. (Cl. 279—6)

This invention relates to improvement in tool holders of the type that are employed for the support of boring bars and instruments of the type that are designed for operative adjustment in eccentric relation to the axis of rotation of the holder.

One of the objects of the invention is to provide mechanisms for radial adjustment of a tool, which is sensitive of operation and capable of resisting the thrust and vibratory reactions imposed thereon during the operation of the tool.

Another object of the invention is to provide graduations on a tool holder which are arranged to accommodate adjustment thereof respective to the position of the tool when the holder comes to rest.

Another object of the invention is to provide a holder which is designed to facilitate the rigid support of the tool and liberal radial adjustment thereof.

Another object of the invention is to provide a holder which will accommodate the support of the tool in parallel relation to the axis of rotation of the holder or at right angles thereto.

Further objects of the invention reside in the provision of a holder which is sturdy of structure and efficient and facile of operation.

Other objects and advantages more or less ancillary to the foregoing and the manner in which all the various objects are realized will appear in the following description, which, considered in connection with the accompanying drawings, sets forth the preferred embodiment of the invention.

Referring to the drawings.

Figure 1:
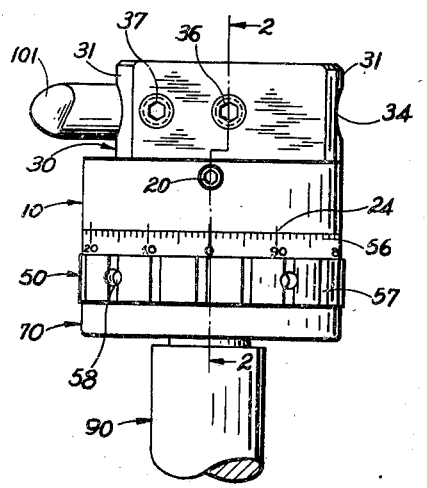
Fig. 1 is a side view of a tool holder in accordance with the invention.

The principal parts of the adjustable tool holder are a body 10, a tool block 30, an adjusting collar 50, and a retainer 70. The body is adapted for mounting on the rotating spindle of a machine tool, and the tool block is mounted on the body for reciprocation transversely of the spindle axis. Adjustment of the position of the tool block is effected by the collar 50 and the parts are retained in operative relation by the ring 70.

While the tool holder will be described as adapted for mounting on a rotating spindle, it may, of course, be held stationary when employed in machine tools in which the work is rotated.

Figure 2:
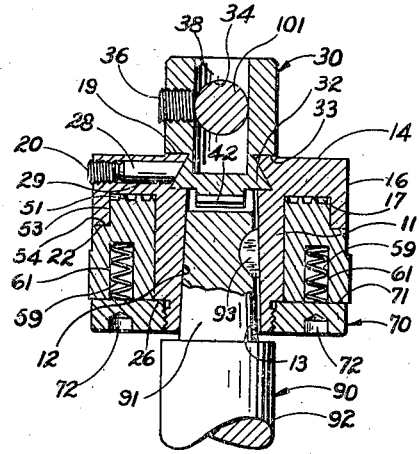
Fig. 2 is a longitudinal section taken on a plane indicated by the line 2—2 in Fig. 1.
Figure 6:
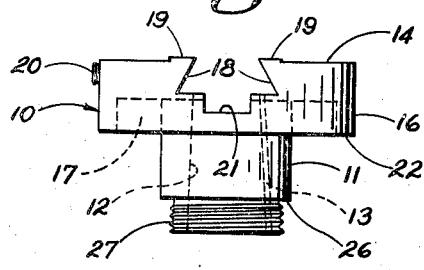
Fig. 6 is a side view of the body of the holder.

The body 10 comprises a cylindrical portion 11 having an axial bore 12 therein for the reception of the arbor or driving shank of the tool. The outer end of the cylindrical portion 11 is formed with an enlarged head 14 which is undercut to define a depending flange 16 and annular recess 17 (Figs. 2 and 6) intermediate the flange and body. A diametral dovetail groove 18 is machined in the head 14, the face of the head adjacent the groove being formed with slightly elevated ledges 19 which are finished to provide a bearing for the tool block 30.

Figure 3:
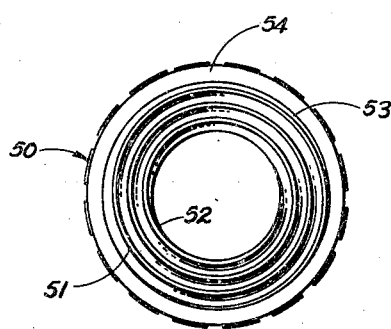
Fig. 3 is a view of the scroll face of the adjusting collar.
Figure 4:
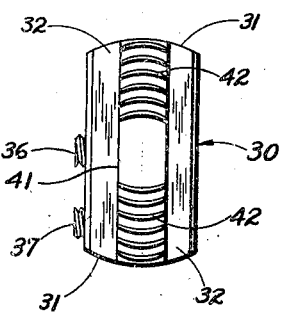
Fig. 4 is a view of the underside of the tool block.
Figure 5:
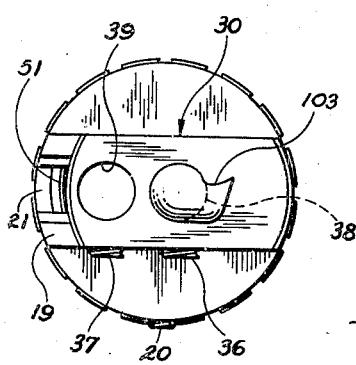
Fig. 5 is a plan view of the face of the tool holder illustrating the mounting of a tool parallel to the axis of the holder.

The tool block (Figs. 1, 2, 4 and 5) is generally of a rectangular form having the end portions 31 thereof rounded to conform to the circumference of the head 14. The base of the block is formed with a longitudinal dovetail tenon 32 machined for sliding engagement with the slot 18 and upon the ledges 19 of the body. A longitudinal bore 34 disposed in normal relation to the axis of rotation of the tool holder is provided in the tool block for the reception of a cutting tool 101 which is retained by set screws 36 and 37. Additional holes 38 and 39 (Figs. 2 and 5) bored parallel to the axis of rotation of the tool are provided for the support of a boring bar, such as the tool 143 (Fig. 5). The holes 38 and 39 are arranged so that either of the set screws 36 and 37 may be used to lock the tool in place. The hole 38 is preferably drilled adjacent the center of the block 30 while the hole 39 is near one end thereof. The tool block is formed with a longitudinal rib 41 depending from the lower face of the tenon 32 which is machined with spiral cut teeth 42 to cooperate with a scroll 51 (Figs. 2 and 3) on the end of the adjusting collar 50. A groove 21, milled in the bottom of the dovetail guideway 18 affords clearance for the rib 41 and teeth 42 thereon.

The collar 50 is machined with an axial bore 52 which is journaled for free rotative movement upon the body 11. The collar is further formed with a reduced end portion 53 which is enveloped by the annular flange 16. The shouldered face 54 of the collar is disposed in abutting engagement with the end wall 22 of the flange 16 in order to provide clearance between the crest of the teeth of the scroll 51 and the inner wall of the annular recess 17. The teeth of the scroll 51, which is in the form of an Archimedean spiral, are engaged with the spiral teeth 42 of the tool block. The teeth 42 may be provided on both ends of the tool block as shown in Fig. 4, to secure full diametric engagement with the scroll or may be provided on one end of the tool block with, however, some sacrifice of strength.

The pitch of the scroll 51 is preferably one-tenth of an inch, so that one turn of the collar 50 will advance the cutting tool one hundred thousandths of an inch. The collar is provided with graduations 56 dividing its periphery into 100 equal portions, and the flange 16 is provided with ten equally spaced index marks 24. The provision of a plurality of index marks on the body facilitates the ready adjustment of the tool irrespective the position at which it comes to rest since the collar may be turned the necessary amount to advance the tool the desired number of thousandths of an inch by moving the scale 56 with reference to any one of the visible marks 24. For convenience in rotating the collar, a portion of the outer surface thereof may be formed with flutes or serrations 57 and holes 58 may be drilled therein for the application of a spanner wrench.

The collar 50 is retained upon the body in slight frictional engagement with the tool block by a threaded ring 70 which is formed with a plane inner face 71 that engages the end of the collar when brought into impinged relation with a shoulder 26 adjacent the threaded end 27 of the body, for engagement with a threaded shank. The lower face of the ring is provided with holes 72 disposed to accommodate the application of a pin wrench or similar tool. With the ring jammed against the shoulder 26, the collar 50 is free to rotate but is held against axial movement of the collar. The inner end of the collar is formed with a plurality of holes 61 for the reception of springs 59 which are disposed for impingement with the ring 70 and adapted to provide sufficient frictional resistance to prevent rotation of the collar after adustment and particularly during operation of the tool.

The tool block 30 may be clamped by a screw 20 engaged with a pin 28 (Fig. 2) having a beveled end thereon which is machined for engagement with the side face of the tenon 32 of the block. The screw 20 is mounted in a tapped radial hole in head 14 of the body of the tool holder.

The preferred form of shank or arbor for the tool holder comprises a unitary member 90 formed with a tapered end portion 91 machined for engagement with the bore 12 of the body 10 and a shank 92 proportioned to fit the usual taper socket in a machine tool. A Woodruff key 93 is provided to prevent rotation of the body relative to the shank.

It is believed that the mode of use of the tool holder will be apparent to those skilled in the art from the description herein of its structure.

The term "torque-exerting part of a machine tool" is employed in the claims as generic to the spindles of boring machines and the like, and the tool posts, tail stocks, and turrets of lathes and, in general, to structures of machine tools in which tools are mounted for movement relative to a work piece being machined and which receive the reaction due to the cutting force. This phrase is adopted because I know of no generic term for these equivalent structures with any of which the tool holder may be used.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. An adjustable tool holder comprising a cylindrical body with a flange at one end, the flange being formed with a substantially diametral way, a tool block slidable in the way, an adjusting collar rotatable on the body and formed with a scroll on one end, the tool block having a portion engaging the scroll for adjustment of the position of the tool block, a removable flange on the body retaining the collar thereon, and means for providing friction between the collar and the removable flange.

2. An adjustable tool holder comprising a head adapted for mounting on a machine tool spindle, the head being formed with an annular body, and a face of larger diameter than the body at one end thereof and perpendicular to the axis thereof, the face being formed with a transverse dovetail slot; a tool block engaging the face and formed with a dovetail tenon engaged in the slot for reciprocation therein; a collar rotatable on the head adjacent the face portion, the face of the collar being formed with a scroll thereon; teeth on the tenon engaging the scroll whereby rotation of the collar on the head causes reciprocation of the tool block; a retainer removably mounted on the end of the body opposite the face end for maintaining the scroll in engagement with the teeth; and resilient members compressed between the collar and retainer for frictionally opposing rotation of the collar.

3. An adjustable tool holder comprising a head adapted for mounting on a machine tool spindle, the head being formed with a cylindrical body, a face of larger diameter than and perpendicular to the body at one end thereof, and a flange on the face extending in the direction of the body, the face being formed with a transverse dovetail slot; a tool block engaging the face and formed with a dovetail tenon engaged in the slot for reciprocation therein; a collar rotatable on the body and having a portion within the flange, the end of the collar being formed with a scroll thereon; teeth on the tenon engaging the scroll whereby rotation of the collar on the body causes reciprocation of the tool block; a retainer removably mounted on the end of the body opposite the face end for maintaining the scroll in engagement with the teeth; and resilient members received in the collar and compressed between the collar and retainer for frictionally opposing rotation of the collar.

4. An adjustable tool holder comprising an annular body formed with a flange on one end and a shoulder on the other end, and formed with a way extending across the face of the flanged end thereof, a tool block slidable in the way, a collar coaxial with the body and rotatable thereon abutting the flange, a scroll on the collar, teeth on the tool block engaging the scroll, and a retainer on the body lodged against the shoulder and abutting the collar.

5. An adustable tool holder comprising an annular body formed with a flange on one end and a shoulder on the other end, and formed with a way extending across the face of the flanged end thereof, a tool block slidable in the way, a collar coaxial with the body and rotatable thereon abutting the flange, a scroll on the collar, teeth on the tool block engaging the scroll, a retainer on the body lodged against the shoulder and abutting the collar, and means for providing frictional resistance between the shoulder and collar to oppose rotation of the collar.

6. An adjustable tool holder comprising an annular body formed for mounting on a torque-exerting part of a machine tool and provided with a substantially diametral way, a tool block non-rotatably mounted in the way and slidable in the way, and an adjusting collar journalled on the body, extending around the periphery of the body, and freely rotatable on the body and formed with a scroll on one end, the tool block having a portion engaging the scroll for adjustment of the position of the tool block longitudinally of the way.

FRED A. MAXWELL.

REFERENCES CITED

The following references are of record in the file of this patent:

UNITED STATES PATENTS

| Number | Name | Date |
| --- | --- | --- |
| 1,241,177 | Watts | Sept. 25, 1917 |
| 1,373,856 | Bosch | Apr. 5, 1921 |
| 1,463,686 | Frey et al. | July 31, 1923 |
| 2,305,737 | Richards | Dec. 22, 1942 |

OTHER REFERENCES

American Machinist, December 17, 1914.